United States Patent [19]

Lin

[11] Patent Number: 5,552,011
[45] Date of Patent: Sep. 3, 1996

[54] PROCESS OF 3-LAYER CO-EXTRUDED BIAXIAL ORIENTED POLYPROPYLENE (BOPP) SYNTHETIC PAPER

[75] Inventor: Allen F. Lin, Taipei, Taiwan

[73] Assignee: Nanya Plastics Corporation, Taipei, Taiwan

[21] Appl. No.: 321,880

[22] Filed: Oct. 14, 1994

[51] Int. Cl.⁶ .................................................. B29C 35/10
[52] U.S. Cl. .................... 156/244.17; 156/229; 264/414; 264/423; 264/469; 264/41; 264/154; 264/173.14; 264/173.15; 264/288.8
[58] Field of Search ..................... 264/22, 290.2, 264/171, 288.8, 154, 414, 423, 469, 41, 173.15, 154, 173.14; 425/133.5, 131.1, 174.8 E, 174.8 R; 156/229, 244.17

[56] References Cited

U.S. PATENT DOCUMENTS

| | | | |
|---|---|---|---|
| 3,894,904 | 7/1975 | Cook | 264/210.2 |
| 4,191,719 | 3/1980 | Jack et al. | 264/288.8 |
| 4,197,148 | 4/1980 | Shinomura | 264/288.8 |
| 4,420,530 | 12/1983 | Toyoda et al. | 156/229 |
| 4,522,887 | 6/1985 | Koebisu et al. | 428/461 |
| 4,652,409 | 3/1987 | Leese et al. | 264/22 |
| 4,705,813 | 11/1987 | Ito et al. | 264/154 |
| 4,780,364 | 10/1988 | Wade et al. | 264/154 |
| 5,209,884 | 5/1993 | Wood, Jr. | 264/154 |
| 5,211,898 | 5/1993 | Shinmoto | 264/40.7 |
| 5,387,574 | 2/1995 | Campbell et al. | 503/227 |

FOREIGN PATENT DOCUMENTS

| | | | |
|---|---|---|---|
| 2126945 | 12/1971 | Germany | 264/290.2 |
| 53-74577 | 7/1978 | Japan | 264/290.2 |

*Primary Examiner*—Jeffery R. Thurlow
*Attorney, Agent, or Firm*—Beveridge, DeGrandi, Weilacher & Young, L.L.P.

[57] ABSTRACT

The present invention is related to a process of manufacturing polyproylene (PP) synthetic paper and the product thereof, and particularly to a process of manufacturing synthetic paper by means of 3-layer co-extrusion wherein PP resin composite and resin composite are respectively extruded as an extrudate co-flow by one primary extruder and two secondary extruders and by same one T-type die to be a paper sheet with a paper surface layer, an intermediate layer and a paper surface layer, and through cooling/shaping, biaxial orientation, corona discharge treatment and laminating/rolling to be a synthetic paper depending on the required thickness.

2 Claims, 3 Drawing Sheets

PROCESS OF 3-LAYER CO-EXTRUDED BIAXIAL ORIENTED POLYPROPYLENE (BOPP) SYNTHETIC PAPER

BACKGROUND OF THE INVENTION

Nowadays paper made of natural pulp is replaced with polyene synthetic paper of which the basic substance layer (intermediate layer) is the biaxial oriented polypropylene (BOPP) whereon the back surface is laminated with the uniaxial oriented polypropylene (UOPP) of 8–65% weight inorganic fine powder as the paper surface layer (see Japanese Patents 46-40794, 56-141339 and 56-118437 granted to TOKO Kaichaku).

The core of the foregoing synthetic paper in general is the inorganic fine powder and there are fine empty holes around the paper of which the surface has a plurality of stripe-shaped cracks. In order to enhance the intaglio printing, the said surface is coated with the aqueous solution of acrylic acid series polymer and polyimide and then dried for use (see Japanese Patents 50-10624 and 50-161478 granted to Toko Kaichaku.)

In addition, Toko Kaihai's Japanese Patent 3-87255 disclosed using the biaxial oriented film of resin with high crystallizability polypropylene of 35–95% weight and talcum powder and/or mica powder of 65–5% weight over 98% isotacticity as the basic substance layer (intermediate layer) of which at least one surface is laminated with a paper layer formed by the uniaxial oriented film of resin with high crystallizability polypropylene of 20–90% weight and inorganic fine powder of 80–10% weight over 98% isotacticity and finally a multi-layer resin synthetic paper with over 90% opacity is formed.

Such a synthetic paper has the advantage of rigidity, mechnical strength and printing head contact but leaves the opacity, low density and imitation paper surface friction coefficient to be desired, and so far as the resin composite and process thereof are conerned, the produced synthetic paper has to be coated with the aqueous solution of acrylic acid series polymer, etc. to increase the post-treatment of printing, so the opacity, low desnity and imitation paper surface friction coefficient of the said synthetic paper are poor, that is why it is unsuitable for cultural paper. Furthermore, the paper surface layer of said synthetic paper is finished through the upper and lower layer-increasing filming by two extruders between longitudinal and lateral orientation devices. The paper surface layer of finished filming can only be laterally oriented (uniaxially oriented), the surface strength thereof is lower, and the calcium carbonate applied to the said surface is porous and tends to be penetrated by the solvent to deform the said surface and to cause dimensional change, so it is less suitable for printing, and the calcium carbonate on the said surface will come off to trouble the printing operation of printing machine. In addition, the configuration of calcium carbonate is more irregular and causes a coarse surface with a sense of poor quality.

In order to solve the foregoing problem, the present invention adopts a synthetic paper with 3-layer structure, namely, paper surface layer/intermediate layer/paper surface layer, wherein the PP resin composite of intermediate layer is extruded by a primary extruder, and the paper surface layer is the resin composite extruded by two secondary extruders, and all these composites are extruded as an extrudate co-flow by same one T-type die. Therefore, the said synthetic paper with 3-layer structure is made through cooling/shaping, biaxial orientation, corona discharge treatment and laminating/rolling depending on the required thickness (over 100µ). It is different from the 2-layer synthetic paper according to the foregoing Japanese Patene 3-87255 wherein the paper surface is only uniaxially oriented and then layer-increased through filming.

SUMMARY OF THE INVENTION

The essential raw material of paper surface layer of the synthetic paper in accordance with the present invention is PP and polyethylene, and the foggy surface with dull finishing effect of paper surface thereof is better than that of paper surface of which the essential raw material is PP resin according to the foregoing Japanese Patent 3-87255 and the former is closer to the natural pulp product. Moreover, the paper surface layer of the present invention adopts titanium dioxide for whitening, and the whiteness thereof is also better than that of the Japanese Patent 3-87255 which adopted calcium carbonate, so during the printing processing, no paper powder will appear to cause an unfavorable effect. Such a paper surface layer is treated through biaxial orientation and the surface thereof is less easy to be penetrated by the ink solvent, so it is most suitable for printing.

Therefore, the present applicant did his utmost and through countless times of continued experiment and review, found out that beginning with the improvement of PP composite and process without the steps of layer-increasing filming and surface post-treatment, a synthetic paper with low density, opacity and resistance to friction can be made.

DETAILED DESCRIPTION

In order to understand the technical contents of the present invention, the PP resin composite and process (including extrusion, 3-layer co-extrusion, cooling, biaxial orientation, corona discharge treatment, rolling and laminating) are hereby described as follows:

The biaxial oriented polypropylene (BOPP) synthetic paper of the present invention is a 3-layer structure wherein the intermediate layer is extruded with the resin composite comprising high crystallizability PP of 70–80% weight over 97% isotacticity, calcium carbonate master batch of 14–10% weight, titanium dioxide master batch of 13–9% weight and static resistant agent of 3–1% weight by a primary extruder, and the two paper surface layers are extruded with the resin composite comprising PP of 30–55% weight polyethylene of 40–30% weight, titanium, dioxide master batch of 26–14% weight, static resistant agent of 2–0.5% weight, adhesion resistant agent of 1–0.4% weight and UV absorbent of 1–0.1% weight by two secondary extruders. The extrudate co-flow from the said three extruders is extruded through same one T-type die to form a sheet of paper surface layer/intermediate layer/paper surface layer and then become a synthetic paper through biaxial orientation and corona discharge treatment.

The foregoing calcium carbonate master batch consists of calcium carbonate of 40–60 weight and PP resin of 60–40 weight.

The foregoing titanium dioxide master batch consists of titanium dioxide of 40–60% weight and PP resin of 60–40% weight.

The paper surface layer of synthetic paper of the present invention may use inorganic filler of calcium carbonate or PP resin depending on the printability and writing quality of required synthetic paper.

In order to produce the paper for culture, the present invention adopts the high crystallizability PP as the essential raw material.

The PP resin adopted by the present invention is a homogeneous polymer with a high crystallizability of melt flow index (MFI) 2–6 (236° C./2.16 kg, ASTM D 1238) and most of it is isotactic. Such a high molecular configuration allows a tidy array between molecular chains, and the magnitude of molecular weight and the distribution status will affect the mechanical strength and the quality homogeneity of synthetic paper.

The high crystallizability PP resin is normally a homogeneous propylene polymer derived from polymerize propylene with high active Ziegler catalyst, and its isotacticity index (II) is over 97%. The higher the II, the better the film rigidity and heat fastness.

Figure 1:
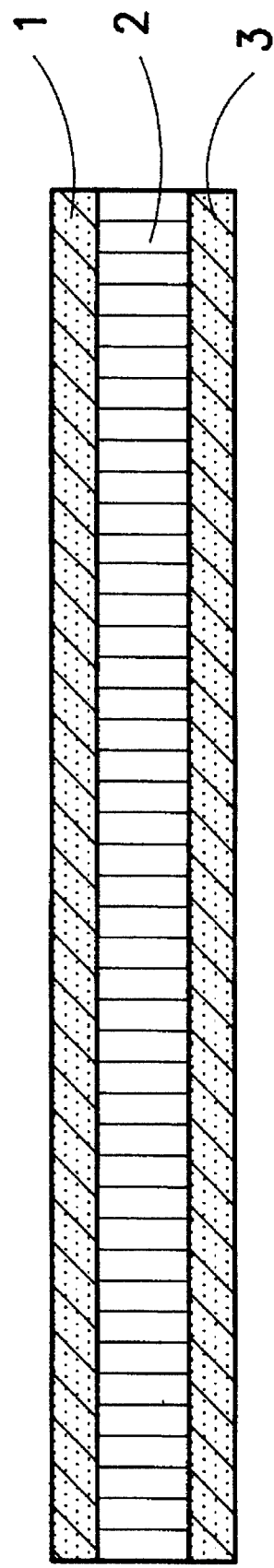
FIG. 1 is a structural view of synthetic paper made according to the process of the present invention.
Figure 2:
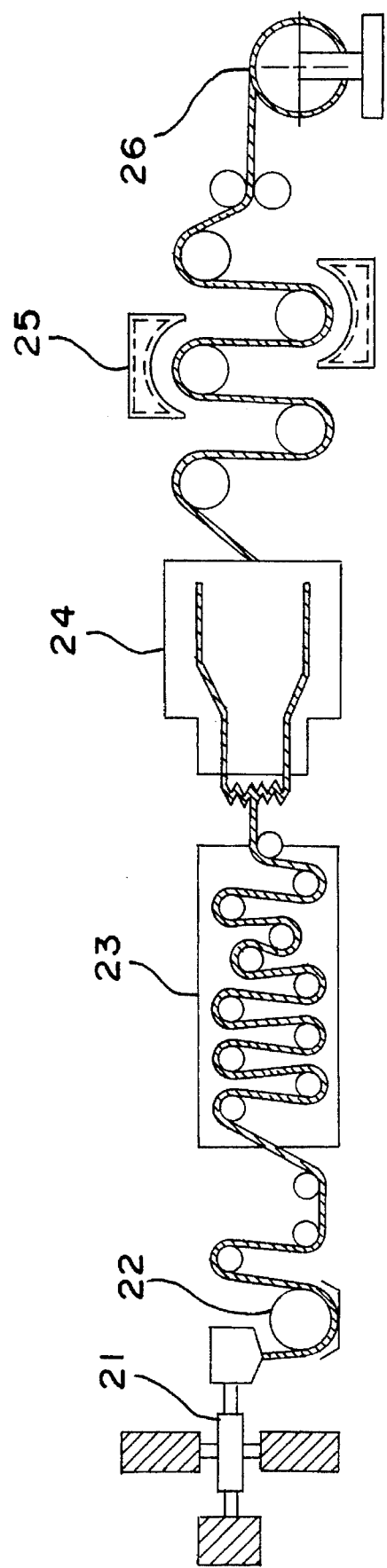
FIG. 2 is a flow chart of manufacturing devices of the present invention.

In order to take care of both the resistance to friction (suitable for printing contact between printing heads) and the rigidity, the synthetic paper, as shown in FIG. 1, is a multi-layer structure. In order to equip the paper surface layer thereof with the resistance to friction and the dull-finishing suitable for the printability and writing quality, the present invention adopts MFI 2–12 PP with additive 4–8% weight which is one of the essential raw material of paper surface layer BOPP synthetic paper according to the present invention and can form a paper surface layer in keeping with polyethylene to achieve a foggy surface dull-finishing effect. As a rule, the brightness of the synthetic paper surface (bright, semi-bright, dull-finished and dull) and the imitation extent thereof may be adjusted with the grade and quantity used of polyethylene so as to produce the synthetic paper suitable for different printability, writing quality and brightness.

The inorganic filler for the paper surface layer of the present invention is selected from one of the group consisting of calcium carbonate, diatomite, clay, titanium dioxide and barium sulphate or a mixture thereof with a granule diameter of 0.5–5 μ, and the quantity used thereof may be 2–4% depending on the required writing quality and printability.

The major action of inorganic filler for the present invention is to let PP synthetic paper make use of the irregular configuration of said filler extending to form some fine holes during biaxial orientation, to lower the specific gravity of synthetic paper considerably below 0.75 without additive frothing agent, and to equip the synthetic paper with the best opacity. In consideration of the dispersibility of the inorganic filler, the resin composite of synthetic paper also may use the pre-formed master batch of inorganic filler and PP resin.

The inorganic filler for the intermediate layer of the present invention is a mixture of calcium carbonate or diatomite or clay and titanium dioxide, the using quantity thereof is 15–22% weight, and the said titanium dioxide is essentially red schorl of which the major action is to adjust the shadowing of PP synthetic paper and the whiteness of paper surface and to resist against ultraviolet.

The static resistant agent for the synthetic paper of the present invention may be that for the current BOPP in general, and it is essentially the Grade 3 amine of which the charge translation can eliminate the static effect resulted from processing friction, and the quantity used is 1–3% weight.

In order to prevent the mutual adhesion between the paper surface from happening during rolling the synthetic paper of the present invention, the adhesion resistant agent is required and it may be the current silicon dioxide in general for BOPP so as to upgrade the stretching and flattening of the synthetic paper, and quantity 0.05–0.15% weight is used.

In order to prolong the usable life of the synthetic paper of the present invention and to prevent the said paper subject to the UV action from ageing and decomposing, the UV absorbent is used in a quantity of 0.05–0.15% weight.

The specific gravity of PP synthetic paper product of the present invention may be below 0.75 and adjusted through changing the formula of composition thereof and is lower than 0.79 which is the specific gravity of Toko Kaihai's Japanese Patent 3-87225 so that the consumers can use more area further economically even though the unit weight is the same.

The present invention adopts the synthetic paper with 3-layer structure consisting of paper surface layer/intermediate layer/paper surface layer, wherein the extrudate of PP resin composite from one primary extruder and the extrudate of resin composite from two secondary extruder are co-flow to the same one T-type die for extrusion to form a sheet with 3-layer structure and then result in a synthetic paper through cooling/shaping, biaxial orientation, corona discharge treatment and rolling, and if the synthetic paper thickness over 100μ is required, it will be laminated. Such a synthetic paper through the foregoing process and processing is closely related to its physical property, productivity, equipment and operation. The BOPP product in general is a transparent product with filler. However, in the imitation process, a large quantity of inorganic filler is required to be added to the raw material formula of the PP synthetic paper of the present invention, so the productivity of biaxial orientation, the dispersibility of inorganic filler and the quality stability of product are subject to an ordeal. The different resin composite systems required by various layers of the present invention are extruded by 3-layer co-extrusion device through same one T-type die and other process equipment and processing conditions such as cooling by cooling shaping roller, biaxial orientation (longitudinal orientation first and then lateral orientation), corona discharge treatment and rolling, and the synthetic paper with a thickness over 100μ is laminated, so such desirable properties as high mechnical strength, opacity, low density, stretching/flattening and high printing analyticity are much better than those of 3-layer synthetic paper of Japanese Patents wherein the paper surface layer is merely uniaxially oriented and then layer-increased by filming.

The devices in keeping with the process of PP synthetic paper of the present invention are described as follows;

1. Extruder device (21): Comprising one primary extruder and two secondary extruders of which the temperature conditions vary with the raw material of resin composite, MFI, crystallinity, viscosity, additive and production line speed (rolling speed) but normally is set in the range of 200°–280° C. If below 200° C., the resin gelatinization will be poor and cannot be pushed out of the T-type die; and if over 280° C., the resin will be heated to gelatinize and cannot be used for production. The present invention is achieved for the 3-layer (paper surface layer/intermediate layer/paper surface layer) synthetic paper in the manner of 3-layer co-extrusion, wherein the paper surface layer resin composite is extruded by two secondary extruders, and the intermediate layer PP resin composite is extruded by one primary extruder, and these 3-layer extrudate forms a co-flow at the T-type die for 3-layer co-extrusion through a designed combination of T-type die flow path.

2. Cooling shaping roller device(22): Adopting the water cooling or air cooling device to cool and form the foregoing 3-layer co-extrudate. The successful control of cooling temperature during this process is considerably related to the smoothness of steps during the following process. The cooling temperature is normally set at 15°–60° C. depending on the synthetic paper thickness and the production line speed and may be adjusted in such a range.

3. Longitudinal orientation device(23): The cooled and shaped paper sheet is fed in this device for pre-heat to soften the paper sheet at 120°–150° C. (depending on the required paper sheet thickness and production line speed), and then oriented in two phases, to wit, high and low speed orientation, so as to enhance the longitudinal mechanical strength of PP synthetic paper which is then tempered and formed, and normally the longitudinal orientation magnification is set at 3–6 times.

4. Lateral orientation device(24): The thinner paper sheet formed through the foregoing longitudinal orientation treatment is preheated and softened at 150°–185° C. (depending on the paper sheet thickness and production line speed) and then laterally oriented and finally tempered and formed so as to partially reduce the PP synthetic paper for enhancing its dimensional stability. Normally the lateral orientation magnification is set at 5–12 times depending on the required feature of product.

5. Corona discharge treatment device(25): Such a treatment is to improve the surface characteristics of PP synthetic paper for the processing steps in order to make the said paper desirable for printing, coating and spreading. A high frequency wave device discharging (with a power of 20–120 KW, depending on the production line speed for adjustment) is used so as to achieve a surface moisturizing tension up to 36–45 dyne/cm.

6. Rolling device(26): The produced BOPP synthetic paper of the present invention is rolled to be an end product with 6M width by a reel, and then striped and packed to be a product below 100μ depending on the required specifications.

Description of 3-layer thickness ratio of product below 100μ of the present invention:

| Layer | 60μ | 80μ | 100μ |
| --- | --- | --- | --- |
| Paper surface layer | 1μ–20μ | 1μ–20μ | 1μ–20μ |
| Intermediate layer | 58μ–20μ | 78μ–40μ | 98μ–60μ |
| Paper surface layer | 1μ–20μ | 1μ–20μ | 1μ–20μ |

The paper surface layer thickness may be 1μ–20μ and adjustable depending on the demand of product.

Figure 3:
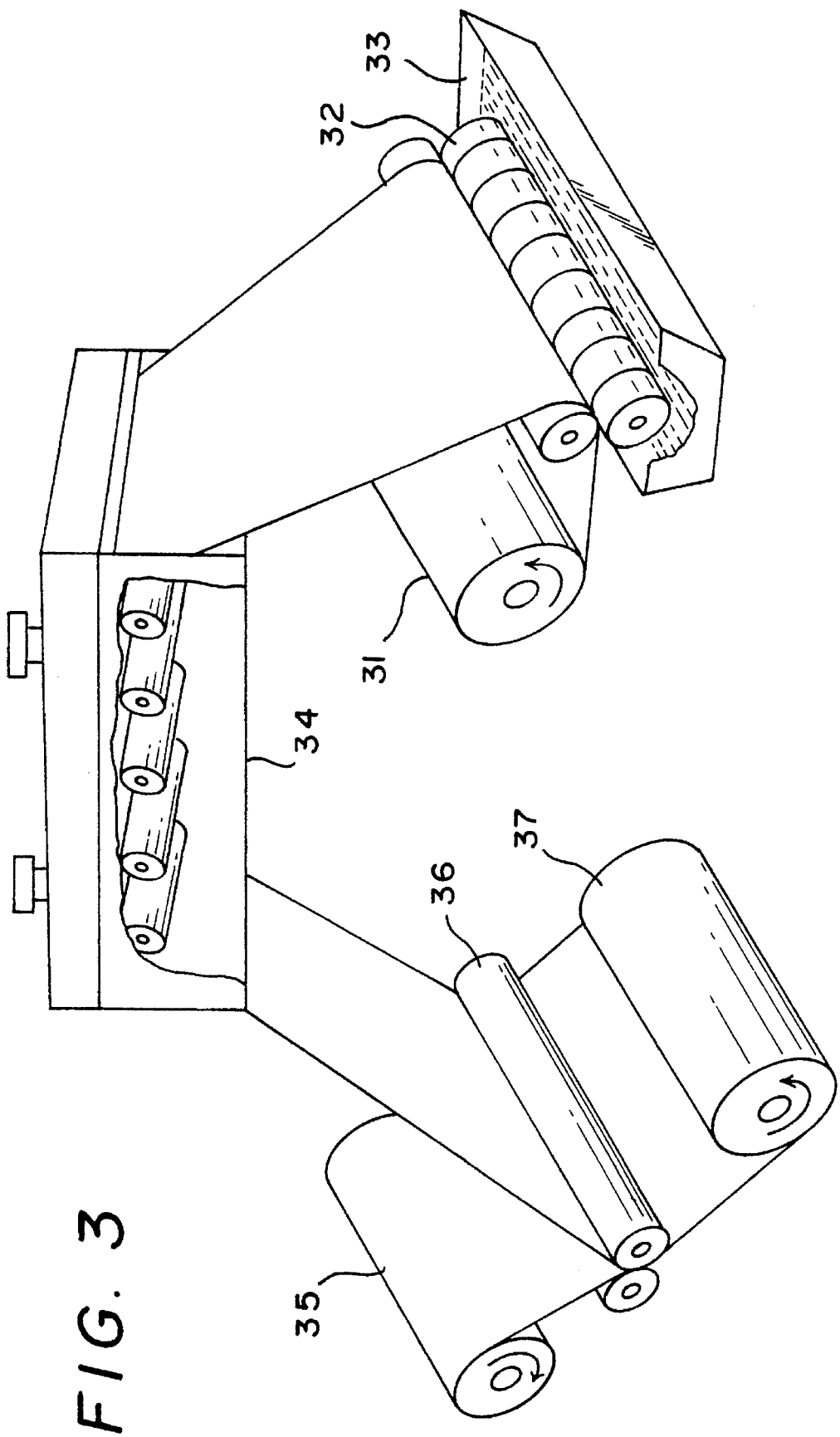
FIG. 3 is an elevational view of laminating device of the present invention.

7. Laminating device(as shown in FIG. 3): If the required thickness of PP synthetic paper is over 100μ, it is laminated by this laminating device. Before laminating, the surface of each layer is coated; however, the model of coating roller depends on the spreading quantity of coating and the viscosity of primer. The primer should be suitable for the addition product of polyamide-ester series or other polyimide and polyamide-inide and acrylic ester polymer of grade 4 ammonium to laminate PP Substance. This device disposes two rolls of synthetic paper with same or different thickness below 100μ at the coating starting stage (31) and the laminating starting stage (35) respectively. The synthetic paper at the coating starting stage (31) is surface coated through a concave plate coating roller (32) to dip out the liquid glue from the glue trough(33), the coated synthetic paper is dried by a dryer(34) at 30°–70° C. to eliminate the solvent in the liquid glue, then the synthetic paper is laminated with another roll of synthetic paper from another laminating starting stage(35) on the laminating roller(36) at 40°–70° C. The laminated two rolls of synthetic paper are integrated as one roll to be rolled up as end product with a thickness of 100μ of the present invention by means of a rolling machine(37).

The synthetic paper produced according to the process of the present invention for writing, printing, packing and various purposes of paper is best described hereinafter in conjunction with the following examples:

EXAMPLE 1

PP synthetic paper with double foggy face below 100μ thickness

The PP (MFI:2.0) of 76% weight, master batch of calcium carbonate(60%) of 13% weight, master batch of titanium dioxide(50%) of 9% weight and static resistant agent of 2% weight are mixed by a mixer and fed in one primary extruder. PP of 42% weight, polyethylene of 34% weight, master batch of titanium dioxide(50%) of 21% weight, static resistant agent of 1.5% weight, adhesion resistant agent of 1% weight and UV absorbent of 0.5% weight are mixed by a mixer and fed in two secondary extruders. Under the temperature 200°–280° C. of extruders, these mixtures are extruded through same one T-type die in the manner of 3-layer co-extrusion. Under the temperature 15°–60° C. of cooling roller, PP paper sheet is cooled and shaped and then fed in the longitudinal orientation device for preheating at 120°–150° C. and 5-time longitudinal orientation and then tempered and cooled. Next, the said paper is fed in the lateral orientation device for preheating at 150°–185° C. and 9-time lateral orientation and then tempered and coold to control its reducing rate. After lateral orientation, it is corona discharge treated to equip it with better printability, and finally it is rolled up by a rolling machine. The double-face PP synthetic paper with a thickness below 100μ produced according to the foregoing process is equipped with a fine printing analyticity and can be extensively used for writing, printing, packing and various purposes of paper. The physical property of PP synthetic paper with thickness of 60μ and 80μ produced according to this example is shown in Table 1.

EXAMPLE 2

PP synthetic paper with single foggy face below 100μ thickness

To mix PP(MFI:4) of 75% weight, master batch of calcium carbonate(60%) of 11% weight, master batch of titanium dioxide(50%) of 11% weight and static resistant agent of 3% weight by a mixer and feed this mixture in one primary extruder, to mix PP of 37% weight, polyethylene of 37% weight, master batch of titanium dioxide(50%) of 23% weight, static resistant agent of 1.5% weight, adhesion resistant agent of 1% weight and UV absorbent of 0.5% weight by a mixer and feed this mixture in the first secondary extruders, and to mix PP(MFI:2.4) of 95% weight, static resistant agent of 3% weight and adhesion resistant agent of 2% weight by a mixer and feed this mixture in the second secondary extruder, to extrude all these mixtures through same one T-type die in the manner of 3-layer coextrusion under the extruder temperature 200°–280° C., and to cool and shape the PP synthetic paper sheet under the cooling roller temperature 15°–60° C. To feed the shaped paper sheet in the longitudinal orientation device for preheating at 120°–150° C. and 5-time longitudinal orientation and temper and cool it. To feed it in the lateral orientation device for preheating at 150°–185° C. and 8-time lateral orientation and to temper and cool it so as to control its reducing rate, and to roll up the said paper by a rolling machine after corona discharge treatment so as to give it a better printability. The single foggy face PP synthetic paper with a thickness below 100μ is for writing, printing and packing. The physical property of PP synthetic paper with thickness of 60μ and 80μ prepared according to the present example is shown in Table 1.

EXAMPLE 3

PP synthetic paper with single semi-foggy face below 100μ thickness

To mix PP(MFI:6) of 74% weight, master batch of calcium carbonate(60) of 10% weight, master batch of titanium dioxide(50%) of 13% weight and static resistant agent of 3% weight by a mixer and feed this mixture in one primary extruder, to mix PP of 40% weight, polyethylene pf 32% weight, master batch of titanium dioxide(50%) of 24% weight, static resistant agent of 2% weight, adhesion resistant agent of 1% weight and UV absorbent of 1% weight by a mixer and feed this mixture in the first secondary extruder, and to mix PP(MFI:2.4) of 95% weight, static resistant agent of 3% weight and adhesion resistant agent of 3% weight by a mixer and feed this mixture in the second secondary extruder, to extrude all these mixtures through same one T-type die in the manner of 3-layer co-extrusion under the extruder temperature 200°–280° C., and to cool and shape the PP synthetic paper sheet under the cooling roller temperature 15°–60° C. To feed the shaped paper sheet in the longitudinal orientation device for preheating at 120°–150° C. and 5-time longitudinal orientation and temper and cool it. To feed it in the lateral orientation device for preheating at 150°–185° C. and 8-time lateral orientation and to temper and cool it so as to control its reducing rate, and to roll the said paper by a rolling machine after corona discharge treatment so as to give it a better printability. The single semi-foggy face PP synthetic paper with a thickness below 100μ is for writing, printing and packing which require only the single semi-foggy face paper. The physical property of PP synthetic paper with a thickness of 60μ produced according to this example is shown in Table 1.

EXAMPLE 4

PP synthetic paper with a required thickness 120μ(over 100μ) finished by a laminating machine (as shown in FIG. 3)

To dispose two rolls of 60μ PP synthetic paper at the coating starting stage (31) and the laminating starting stage (35) respectively. The said paper at the coating starting stage (31) is surface coated through a concave plate coating roller (32) with 175 lines and 35μ depth to dip out the glue liquid from the glue trough (33). The coated PP synthetic paper with a thickness of 60μ is dried by a dryer (34) with a length of 10 meters at 30°–70° C. to eliminate the solvent in the glue liquid, then the said paper is laminated with another roll of 60μ PP synthetic paper from another laminating starting stage (35) on the laminating roller (36) at 40°–50° C. The laminated two rolls of 120μ PP synthetic paper are integrated as one roll with thickness of 120μ and rolled up as end product by a rolling machine (37).

The PP synthetic paper product with a thickness over 100μ can be finished thru laminating in line with the foregoing conditions. The physical property of PP synthetic paper with 120μ and 160μ thickness produced according to this example is shown in Table 1.

TABLE 1

A comparison of physical property of products between the examples of the present invention and those of Toko Kaihai's Japanese Patent 3-87255

| Physical property | Example | | | | | | | Toko Kaihai Patent 3-87255 | | |
|---|---|---|---|---|---|---|---|---|---|---|
| | 1 | 1 | 2 | 2 | 3 | 4 | 4 | | | |
| | 60μ | 80μ | 60μ | 80μ | 60μ | 120μ | 180μ | 60μ | 80μ | 150μ |
| Specific gravity g/cm³ (ASTM D1248) | 0.74 | 0.74 | 0.72 | 0.72 | 0.72 | 0.75 | 0.75 | 0.79 | 0.79 | 0.79 |
| Basic weight g/m² (P-8124) | 44.4 | 59.2 | 43.2 | 57.6 | 43.2 | 90 | 120 | 47.4 | 63.2 | 118.5 |
| Whiteness % (ASTM E131) | 94 | 95 | 93 | 94 | 93 | 96 | 96 | 88 | 91 | 94 |
| Shadowing rate % (JIS P-8138) | 80 | 85 | 75 | 78 | 75 | 94 | 96 | 60 | 68 | 88 |
| Brightness % (ASTM D-2457) | 5 | 5 | 5 | 5 | 7 | 5 | 5 | 7 | 7 | 7 |
| Friction coefficent (ASTM D-1894) | 0.25 | 0.25 | 0.25 | 0.25 | 0.25 | 0.25 | 0.25 | 0.30 | 0.30 | 0.30 |
| Surface impedance Ω (ASTM D257) | 9 × 10" | 9 × 10" | 9 × 10" | 9 × 10" | 9 × 10" | 9 × 10" | 9 × 10" | 9 × 10" | 9 × 10" | 9 × 10" |
| Tensil Strength (kg/mm²) Orientation MD (ASTM D882) | 7.52 | 7.62 | 8.88 | 8.76 | 8.86 | 9.5 | 9.8 | 5.4 | 5.9 | 6.0 |
| CD | 15.6 | 15.7 | 15.6 | 15.5 | 16.4 | 17.2 | 16.3 | 16.3 | 16.0 | 15.2 |

TABLE 1-continued

A comparison of physical property of products between the
examples of the present invention and those of Toko Kaihai's Japanese Patent 3-87255

| Physical property | Example 1 60μ | 1 80μ | 2 60μ | 2 80μ | 3 60μ | 4 120μ | 4 180μ | Toko Kaihai Patent 3-87255 60μ | 80μ | 150μ |
|---|---|---|---|---|---|---|---|---|---|---|
| Stretching rate (%) (ASTM D882) | | | | | | | | | | |
| MD | 138 | 153 | 128 | 139 | 130 | 135 | 138 | 144 | 120 | 137 |
| CD | 32 | 34 | 37 | 37 | 38 | 35 | 38 | 26 | 29 | 31 |
| Yang's coefficient (kg/m$^2$) (ASTM D882) | | | | | | | | | | |
| MD | $0.75 \times 10^5$ | $0.75 \times 10^5$ | $1.36 \times 10^5$ | $1.32 \times 10^5$ | $1.34 \times 10^5$ | $1.48 \times 10^5$ | $1.52 \times 10^5$ | $0.84 \times 10^5$ | $0.84 \times 10^5$ | $0.78 \times 10^5$ |
| CD | $7.8 \times 10^5$ | $7.6 \times 10^5$ | $7.43 \times 10^5$ | $7.56 \times 10^5$ | $7.4 \times 10^5$ | $8.5 \times 10^5$ | $9.5 \times 10^5$ | $9.46 \times 10^5$ | $8.93 \times 10^5$ | $7.92 \times 10^5$ |
| Remarks | In the fields of specific gravity, basic weight, whiteness, shadowing rate and friction coefficient, the synthetic paper of the present invention is bettern than the prodcct of Toko Kaihai's Japanese Patient 3-87255. | | | | | | | | | |

I claim:

1. A process for manufacturing a 3-layer co-extruded biaxial-oriented polypropylene (BOPP) synthetic paper comprising:
   (a) extruding by means of a primary extruder an intermediate layer from a first resin composition comprising 70–80% by weight of a high crystallinity polypropylene having over 97% isotacticity, 14–10% by weight of a calcium carbonate master batch, 13–9% by weight of a titanium dioxide master batch, and 3–1% by weight of a static resistant agent;
   (b) extruding by means of two secondary extruders two paper surface layers from a second resin composition comprising 30–55% of polypropylene, 40–30% by weight of polyethylene, 26–14% by weight of a titanium dioxide master batch, 2–0.5% by weight of a static resistant agent, 1–0.4% by weight of an adhesion resistant agent, and 1–0.1% by weight of an UV absorbent;
   said first and second resin composition being extruded for co-flow at 200° to 280° C.;
   (c) extruding said co-flow through a T-die to form a paper sheet with three layers comprising a top paper surface layer, an intermediate layer, and a bottom paper surface layer, wherein said intermediate layer is formed from an extrudate from said primary extruder and said top paper surface and said bottom paper surface layer is formed from an extrudate from said two secondary extruders;
   (d) cooling and shaping said paper sheet by passing through a cooling roller at 15° to 60° C. and being biaxially oriented for 3–6 times of longitudinal orientation through preheating, orienting and tempering under 120° to 150° C. and for 5–12 times of lateral orientation through preheating, orienting and tempering under 150° to 185° C.;
   (e) treating said paper sheet through corona discharge treatment with high frequency wave under a power of 20–120 KW; and
   (f) rolling said paper sheet from (e) through a rolling device to form a roll of synthetic paper having a thickness of 30μ–100μ.

2. The process according to claim 1, further comprising:
   (g) disposing one roll of said synthetic paper on a coating starting device and disposing another roll of said synthetic paper on a laminating starting stage;
   (h) coating said roll of synthetic paper disposed on said coating starting device, drying and laminating with said roll of synthetic paper disposed on said laminating starting stage by means of a laminating roller to form a polypropylene synthetic paper with a thickness of more than 100μ:
   (i) rolling up said laminated polypropylene paper having a thickness of more than 100μ by means of a rolling machine.

* * * * *